United States Patent [19]
Wild

[11] 3,718,431
[45] Feb. 27, 1973

[54] METHOD OF STOOL SAMPLE COLLECTION AND TESTING APPARATUS THEREFOR

[76] Inventor: John J. Wild, 1100 East 36th St., Minneapolis, Minn. 55407

[22] Filed: Feb. 1, 1971

[21] Appl. No.: 111,253

[52] U.S. Cl. .......................23/230 B, 23/253, 4/110, 4/112, 128/2 F, 128/283
[51] Int. Cl. ...........................A61b 5/00, G01n 33/16
[58] Field of Search .......23/230 B, 253; 4/1, 6, 9, 99, 4/110, 112; 128/2 F, 2 R, 2 W, 275, 283, 294, 295

[56] References Cited

UNITED STATES PATENTS

| | | | |
|---|---|---|---|
| 3,447,536 | 6/1969 | Snyder | 128/283 |
| 3,466,145 | 9/1969 | Van Duyne | 23/253 R |
| 3,625,654 | 12/1971 | Van Duyne | 23/253 R |
| 3,540,433 | 11/1970 | Brockman | 128/283 X |

*Primary Examiner*—Morris O. Wolk
*Assistant Examiner*—R. M. Reese
*Attorney*—Carlsen, Carlsen & Sturm

[57] ABSTRACT

A disposable device for private collection and testing of stool samples of human fecal discharge for the presence of abnormalities such as occult, or hidden blood, which may be a sign of malfunctioning of the intestinal tract of a patient. The device is self-contained and disposable after the test, which can be read by the patient himself. A flexible sample receiving member includes a portion adapted to gravitationally receive an intestinal stool discharge whereby a stool specimen may be deposited in the device and retained in a longitudinally elongated shape during sampling of the stool. After deposition of surface samples of the stool on the surface of the test medium, the stool may be allowed to pass down into the toilet leaving said samples in the device for further test processing.

In one such test a reagent can be dispersed longitudinally on the sample, the test "read" by the reaction, if any, of the reagent, the results noted, after which the entire device and stool samples are disposed of without requiring any direct handling or transportation to a laboratory, or the like.

10 Claims, 9 Drawing Figures

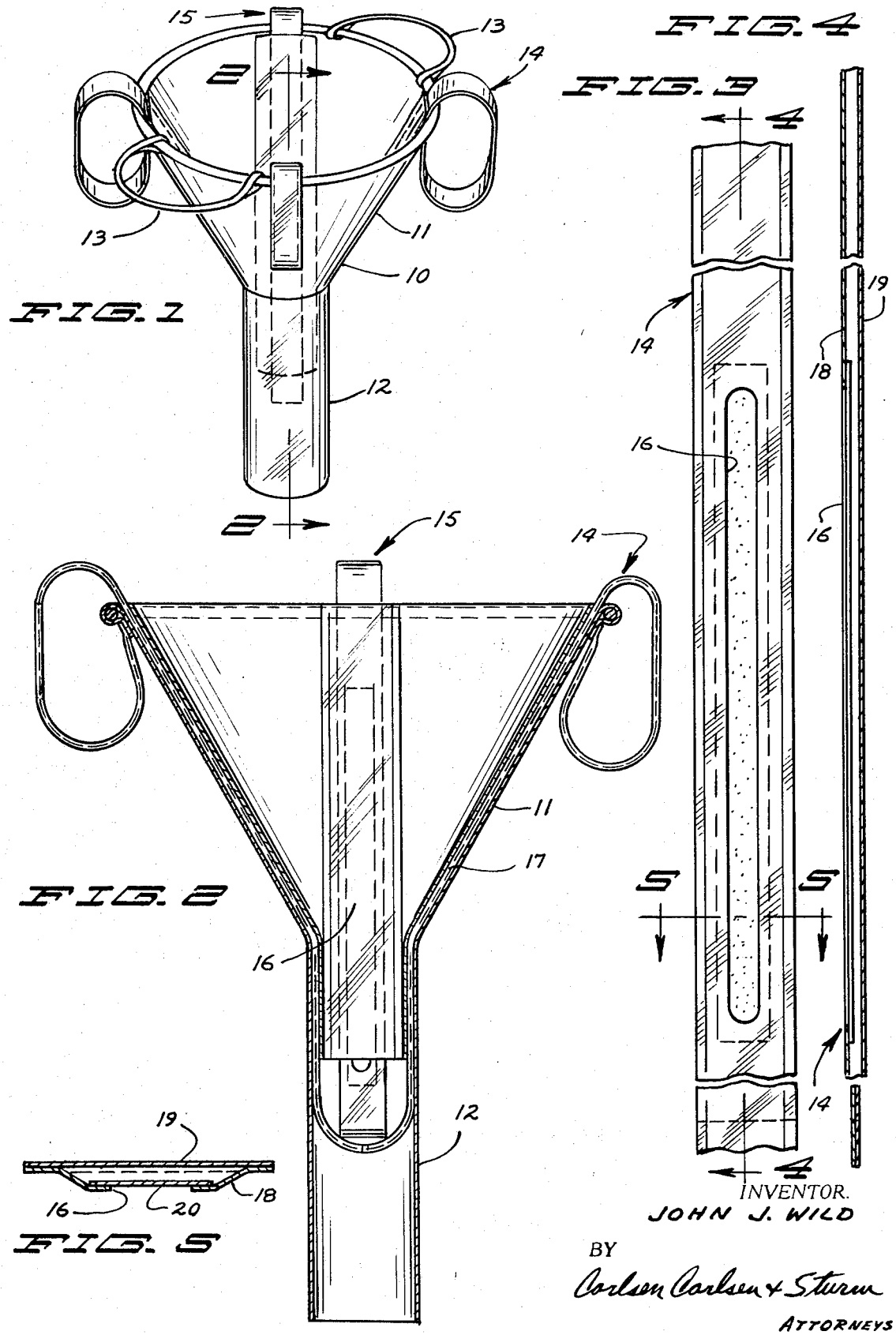

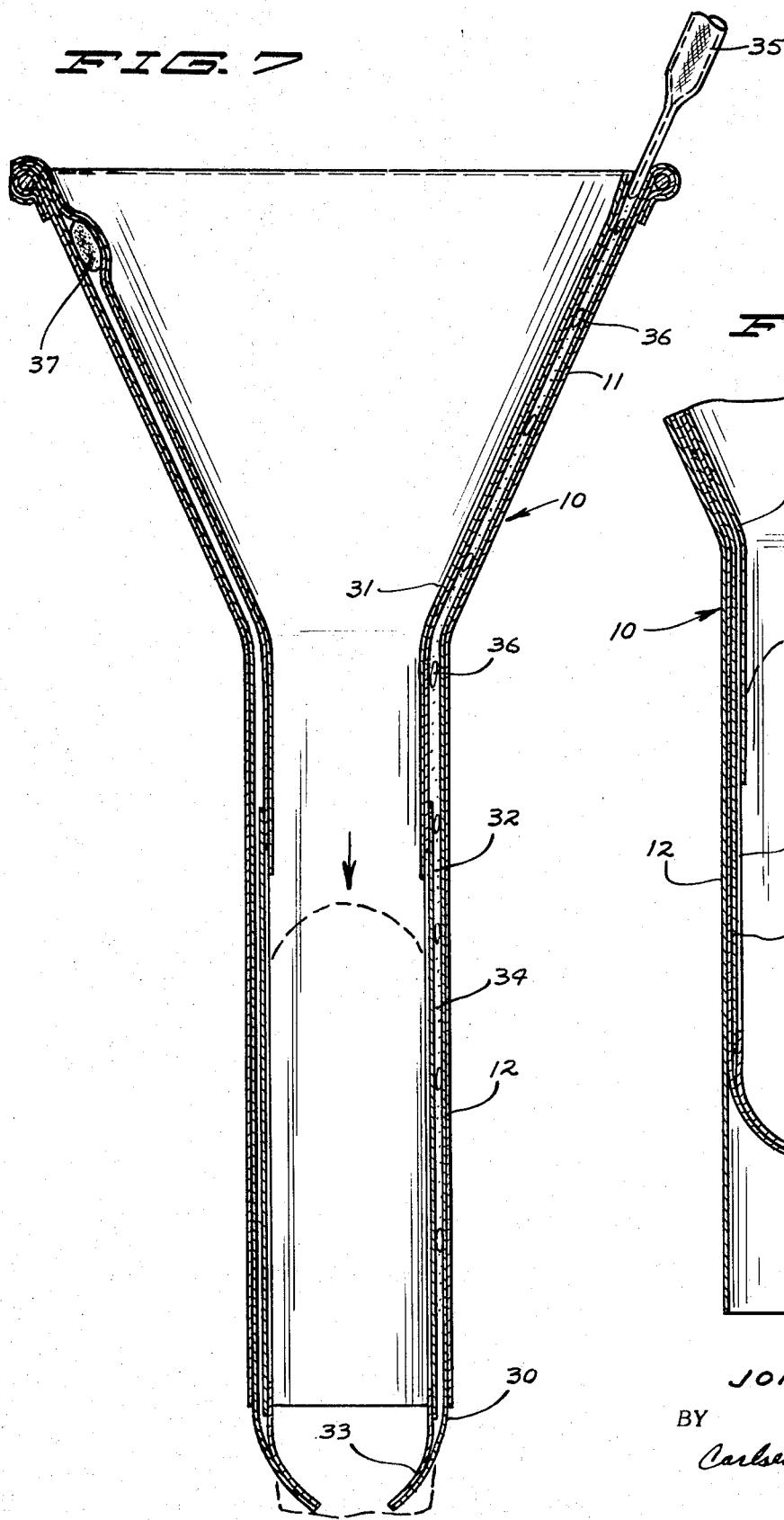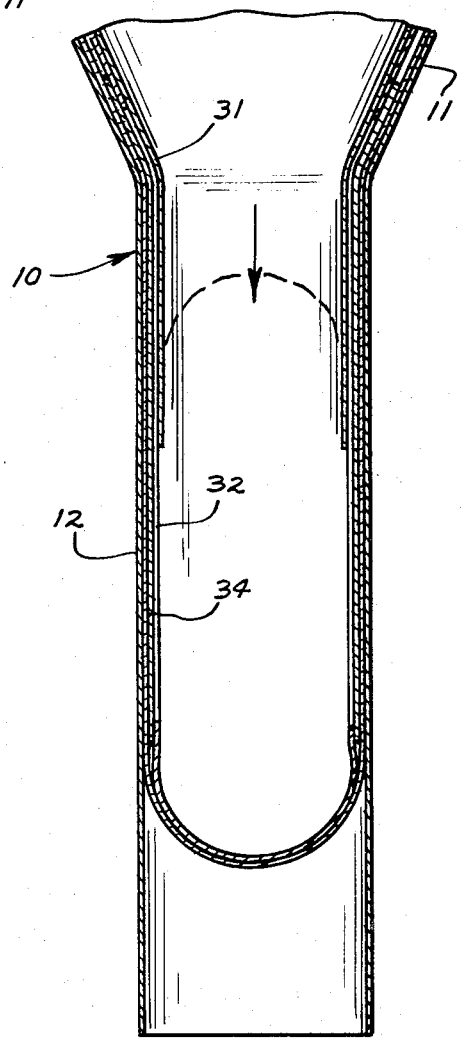

INVENTOR.
JOHN J. WILD

METHOD OF STOOL SAMPLE COLLECTION AND TESTING APPARATUS THEREFOR

SUMMARY OF THE INVENTION

In the present age of preventive medicine, the mass application of various clinical tests upon large numbers of patients has resulted in the early discovery and cure of a number of diseases which have heretofore resulted in terminal illness due to the lack of reasonable, easily accessible preliminary screening and diagnostic procedures and tests. One such group of diseases concerns the early detection of intestinal malfunctions which manifest themselves by exhibiting the presence of hidden blood in the stool discharged from the intestinal tract. Blood which is not visible upon the stool sample or feces of a patient is classified as occult blood, which has heretofore been detected only through an extensive clinical procedure which required the collection, storage, transportation, and finally a chemical analysis of the stool sample of the patient. This procedure has long been regularly followed in clinical practice as a reasonable preventive practice for persons in the over 35 age group in connection with, for example, an annual physical examination. Once the presence of occult blood has been detected, further testing at shorter intervals becomes desirable and necessary to adequately safeguard the health of a patient.

My invention provides an improved testing apparatus which, because of its simplicity and convenience, may be of great value in mass screening surveys or testing of a large number of patients with the test being conducted by the patient himself in the privacy of his own home and without requiring the sometimes unpleasant and embarrassing transference of a stool sample and the higher expense of a full clinical analysis. Once the presence of the material demonstrating the possible existence of a disease is detected, further tests are normally done by the medical practitioner to determine the cause or causes of the abnormalities in the stool.

In my invention, a disposable apparatus is provided for receiving, collecting, passage and passing through a stool specimen from a patient, following which a suitable biological testing procedure is applied to the stool samples left in the apparatus. In one biological test a readily recognizable color indication of the results of the testing procedure is produced and then the entire specimen and testing apparatus may be readily disposed of by depositing the same in a toilet, or other suitable sewage receptacle. Also, the surface stool samples collected by passage of the stool may be conveniently transported warm, moist and undeteriorated to a laboratory for other testing with minimum esthetic distaste.

My apparatus is comprised of a generally conical-shaped stool receiving portion which has, enclosed within its double walls, slidable members containing stool sample collecting strips which are pulled from between the double-walled portion of the apparatus under the weight of a specimen so that non-sliding axial contact may be made with the surface of the stool passing downwards and the sample collecting test strips. A visual indication of a positive or negative reaction between the stool samples collected on the test strips as described may then be readily obtained and the entire portions disposed of.

With the objectives accomplished by the above described device in mind, those skilled in the art may be further enlightened by a consideration of the appended specification, claims, and drawing in which:

FIG. 1 is a top perspective view of a specimen collecting and testing device incorporating the principles of my invention;

FIG. 2 is a side sectional view of the apparatus shown in FIG. 1 taken along section line 2—2;

FIG. 3 is an enlarged fragmentary sectional view of a portion of the apparatus shown in FIGS. 1 and 2 of the drawings;

FIG. 4 is a sectional view taken along section line 4—4 on FIG. 3;

FIG. 5 is a sectional view taken along section line 5—5 on FIG. 3;

FIGS. 6 and 7 are enlarged side elevational sectional views of a further embodiment of my apparatus;

Briefly, the illustrated preferred embodiments of my invention are comprised of a generally funnel shaped, transparent body member 10 which includes a slidable sample collecting portion 14, 15 or 32, 33 which has provisions for detecting and indicating the presence of predetermined biological phenomena of clinical significance on the surfaces of a stool specimen received, and passing through under gravitational force.

Figure 8:
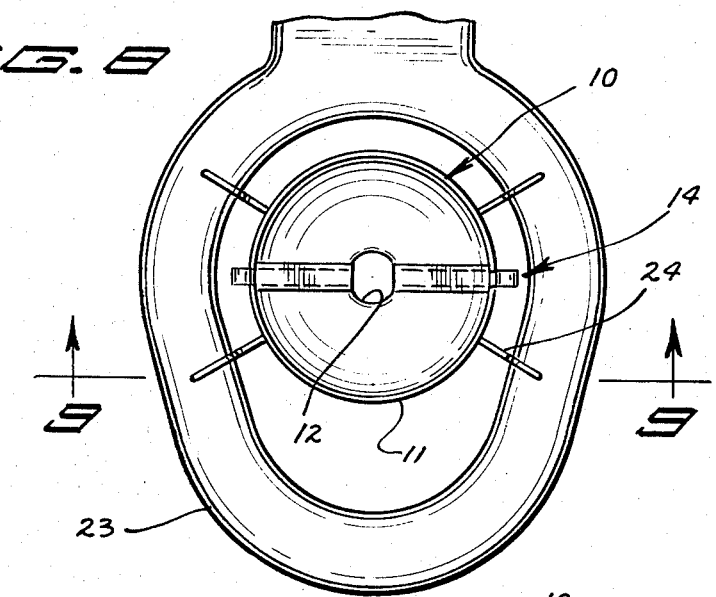
FIG. 8 is a top elevational view on a reduced scale of the apparatus shown in FIGS. 1–5, inclusive, disposed in a holder on the top of a toilet stool seat.
Figure 9:
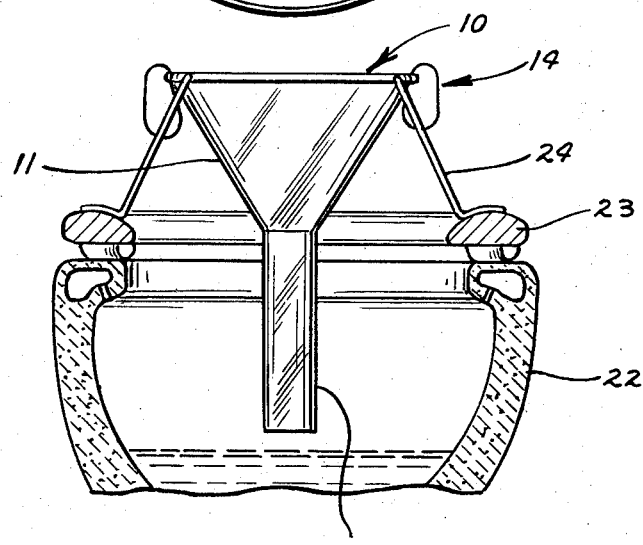
FIG. 9 is a sectional view of the apparatus shown in FIG. 8 taken along section line 9—9.

In the embodiment of FIGS. 1, 2, 3, 4, 5, 8 and 9, a funnel shaped body 10, preferably comprised of transparent plastic material is shown having a conical top portion 11 and an open ended tubular bottom portion 12 affixed thereto. A pair of handles 13 are provided at the upper periphery of conical portion 11 to facilitate disposing the stool specimen receiving device underneath the anal orifice of a patient. A pair of elongated strips 14 and 15, having longitudinal specimen contacting portions 17 and 16, respectively, are disposed so that the sample collecting and testing portions lie in the apex of conical top section 11 in intercrossing relationship to substantially seal the top opening in tubular bottom portion 12 on funnel shaped body member 10. Strips 14 and 15 are slidably enclosed in suitable slots or pockets formed in the side portions of conical top 11 on funnel shaped body 10 and fixed to the rim. In FIGS. 1, 2 and 9 strips 14 and 15 are shown looped for the sake of clarity. In practice they are folded within the said pockets in funnel shaped body 10. Longitudinal extending or axial portions 16 and 17 are disposed to face inwardly into the interior of funnel shaped body 10 so as to serially contact the surfaces of a stool specimen as it is passed into conical top 11 and carried downwardly through its own weight into tubular portion 12 thereof. As may be seen, members 14 and 15 are readily slidable and as the specimen proceeds downwardly into tubular bottom portion 12, a continuous longitudinal serial impression is made with the surface of the stool specimen as the specimen bears on the crossing of members 14 and 15 at their approximate mid-points at the apex of 10 confined in 12.

Referring to FIGS. 3, 4 and 5, it may be seen that tubular members 14 and 15, of which member 14 has been chosen as an illustrative example, are comprised of a length of plastic tubing that may be conveniently fashioned out of a backing strip 19 and a further strip 18, having a longitudinally elongated opening 16 disposed therein. The two members 18 and 19 may be conveniently heat sealed together at their edges and thence disposed on or under suitable guide members fashioned on the interior double surfaces on conical top 11 on funnel shaped body 10. Strip members 14 and 15 may include a specimen contacted, reagent impressed portion 20 that is disposed inside of each of the strips and adjacent the interiorly opening longitudinal portions 16 and 17.

The entire apparatus may, if desired, be conveniently disposed on a suitable holder 24 which is generally shown on FIGS. 8 and 9 in holding supportive relationship with funnel shaped body 10 and removably mounted upon a toilet seat 23 which is in turn mounted on a conventional toilet bowl 22.

OPERATION

Under the usual conditions of operation, the apparatus shown in FIGS. 1, 2, 3, 4 and 5 would normally be adjusted so that strips 14 and 15 would lie with their mid-points substantially at the downwardly disposed apex of conical top 11 on tunnel shaped body 10. A reagent may be suitably disposed on strips 20 in proximity to longitudinally inwardly opening portions 16 and 17 on strips 14 and 15. A stool specimen is then passed into conical top 11 on funnel shaped body 10 and the downward gravitational force will cause it to first contact the crossed mid-point portions of strips 14 and 15 and then be guided and carried downwardly into cylindrical portion 12 on funnel shaped body 10. Contact of the surfaces of the specimen with a suitable reagent disposed on the stool sample receiving portion 20 gives indication of the presence or absence of the predetermined substance which is being tested for. It may also be noted that other forms of sample collecting testing strips embodying circumferential samples may also be utilized in connection with my invention as might be possible using other geometrical forms which may be freely slidable in the manner described above.

As one example of the type of test that has been performed embodying the principles of my invention, reference is made to a liquid reagent comprised of hydrogen peroxide mixed with ethyl alcohol. This mixture is used in connection with the principles of the well-known Guaiac test in which strips 20 are comprised of suitable paper or other absorbent material which has been previously impregnated to the dry state with Guaiac gum resin. This indicator, when in contact with surface samples of the specimen to be tested, exhibits the characteristic of turning blue in the presence of occult blood (pseudo-peroxidases) and the liquid reagent described above. It is possible to add the reagent through the tubes of which the strips 14 and 15 are comprised after the samples have been collected by serial contact and is in testing position in tube 12 on funnel shaped body 10. It is also possible to have the liquid reagent material disposed in breakable pod-like reservoirs 37 at the top ends of strips 14 and 15 or to add liquid reagent by pipetting 35. Under certain conditions, it may be desirable to make the mid-points of strips 14 and 15 of such a material that it will break away at some point after a specimen has been received so as to discharge the specimen into the toilet.

Other tests for occult blood such as the orthotolidine test may occur to those skilled in the art as well as other biological tests for determining the presence of other abnormalities in the stool specimen of a subject. In the performance of other tests, sample collecting test strip 20 may be comprised of materials suitable to collect and display biological materials of interest in the stool sample.

Referring now to FIGS. 6 and 7 of the drawings, a second embodiment of my invention is shown having a funnel shaped body portion 10 which is comprised of a conical top portion 11 and a downwardly depending tubular bottom portion 12 which may preferably be formed of contiguous materials and are shown in cross section only without a support or handles for the sake of clarity.

An inner liner 30 extends downwardly from the top of funnel shaped body 10 from conical top 11 down into tubular bottom portion 12 and is of smaller diameter at its lower central portion (as shown on the bottom of FIG. 7). An inner liner 31 is shown extending from the top of conical portion 11 downwardly about one-third down the length of tubular bottom portion 12. A form of open chamber may then be seen to exist between the intermediate outer liner 30 and inner liner 31. A flexible sample receiving member 32 may normally be disposed with its upper portion extending upwardly into the chamber existing around the periphery of conical top portion 11 on funnel shaped body 10 and in stool specimen receiving position. Member 32 may have a lower end 33 that may subsequently open to release a specimen after sufficient time has elapsed to impress a deposit corresponding to its content on the walls of sample receiving member 32. It may further be noted that member 32 is slidably disposed within conical top portion 11 and tubular bottom portion 12 so that after it has received a specimen it may slide toward the bottom thereof and be disposed in a reagent receiving and test indicating position. In the extended position of FIG. 7, a chamber 34 that is contiguous with the chamber formed between inner and outer liner members 30 and 31 is defined to transmit quantities of test reagent material to the outer periphery of specimen receiving member 32. It should be noted at this point that member 32 may be preferably comprised of a suitable material that will allow migration of the stool sample material to its outside surface. On the other hand, if the material of which member 32 is comprised is permeable or semi-permeable to the liquid test reagent used, a migration of the test reagent in the other direction may prove satisfactory to indicate the results of the test performed.

As illustrated in FIG. 7, a breakable pod of material 37 or the application of reagent from the syringe 35 or a suitable fluid transmitting device to the chamber defined between inner and outer liners 30 and 31 will provide an adequate flow of suitable quantity of liquid reagent material down through conical top portion 11 and into tubular bottom portion 12 whereat it may perform the desired function when present adjacent to the outer surface of stool sample receiving member 32.

While only two embodiments of my invention have been illustrated and described as the preferred embodiments, it is clear that other structures may be perceived by those skilled in the art and it is therefore apparent that the scope of my invention is intended to be limited only by the appended claims.

I claim:

1. The method of testing a stool sample which comprises the steps of:
    a. receiving a fresh stool specimen sample in a generally tubular housing,
    b. retaining said sample in said housing and applying a biological reagent to an external serial section of said sample and the adjacent serial section of said housing, and
    c. observing the serial section of said sample and housing for a predetermined reaction.

2. Disposable diagnostic screening apparatus for receiving and testing a formed stool specimen comprising:
    a generally conical shaped stool specimen sample receiving member adapted to be disposed in stool specimen sample receiving relationship to a patient said member including a generally tubular portion thereof extending downwardly of an opening in the apex of said conical specimen receiving member, said tubular portion including specimen receiving means and retaining means at the lower end thereof whereby a specimen may be received and retained and held in said tubular portion for observation and testing of external serial portions thereof.

3. The apparatus of claim 2 in which at least the tubular portion is transparent to a visual test.

4. The apparatus of claim 2 in which the specimen receiving means is slidably disposed at the apex opening of the conical shaped specimen receiving member and is adapted to slide into the tubular portion to receive and retain at least a testable residue of a specimen and to provide an indication of the presence or absence of a substance in said specimen.

5. The apparatus of claim 4 in which the specimen receiving member is comprised of one flexible member slidably disposed in the conical shaped specimen receiving member with its central portion initially disposed over the apex of said conical specimen receiving member.

6. The apparatus of claim 5 in which the conical receiving member and the downwardly depending generally tubular portion are comprised of continuous material.

7. The apparatus of claim 5 in which the conical shaped specimen receiving member is comprised of an inner and outer layer and the specimen receiving member is disposed at least partially therebetween whereby a test reagent liquid may be deposited at the top open end of said conical shaped specimen receiving member.

8. The apparatus of claim 4 in which the specimen receiving member is comprised of a plurality of strip members which intersect at the apex of the conical shaped specimen receiving member.

9. The apparatus of claim 8 in which the intersecting portions of the strip members are comprised of material exhibiting a limited resistance to the substance of a test specimen whereby said material will retain the specimen for a short time interval before releasing it through the bottom of the tubular portion.

10. The apparatus of claim 8 in which the strip members include portions of material that is at least semi-permeable to the specimen being tested.

* * * * *